Sept. 23, 1930.  L. E. GRESLEY ET AL  1,776,502
CONNECTING MEANS
Filed March 24, 1930

Patented Sept. 23, 1930

1,776,502

UNITED STATES PATENT OFFICE

LEO EARL GRESLEY AND SAMUEL EUSEY, OF PORT HURON, MICHIGAN, ASSIGNORS TO MUELLER BRASS CO., OF PORT HURON, MICHIGAN, A CORPORATION OF MICHIGAN

CONNECTING MEANS

Application filed March 24, 1930. Serial No. 438,364.

This invention relates to fittings and with regard to certain more specific features, to fittings used in connection with conduit such as service pipe and the like and is an improvement upon the structure in Patent No. 1,770,852, issued July 15, 1930.

Among the several objects of the invention may be noted the provision of a fitting adapted to be telescoped with conduit such as pipe and adapted to be sealed therewith by means of a sealing material such as, for example, solder; the provision of a fitting of the class described which has a form of nozzle permitting of more advantageous application and control of heat thereto for softening said sealing material; the provision of a device of the class described which prevents unnecessary loss of sealing material; and the provision of a device of the class described which is exceedingly simple in its manufacture, application and operation. Other objects will be in part obvious and in part pointed out hereinafter.

The invention accordingly comprises the elements and combinations of elements, features of construction, and arrangements of parts, which will be exemplified in the structure hereinafter described, and the scope of the application of which will be indicated in the following claim.

Figure 1:
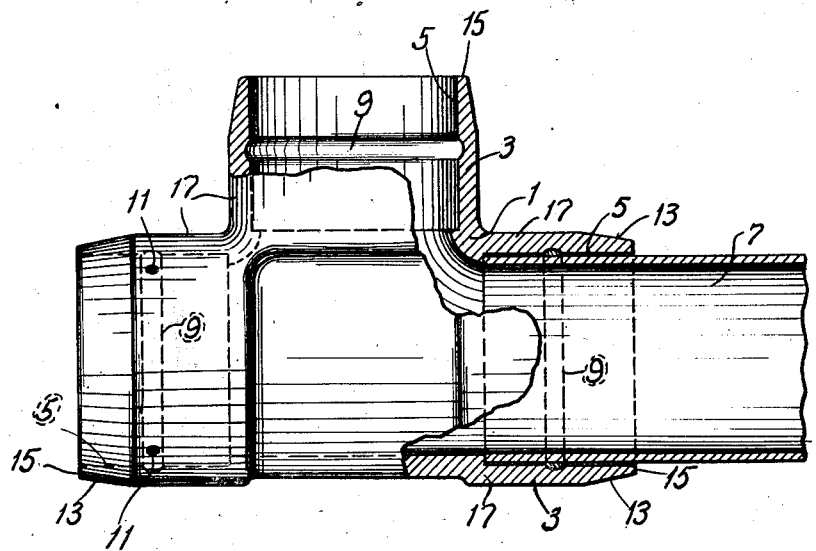
Figure 2:
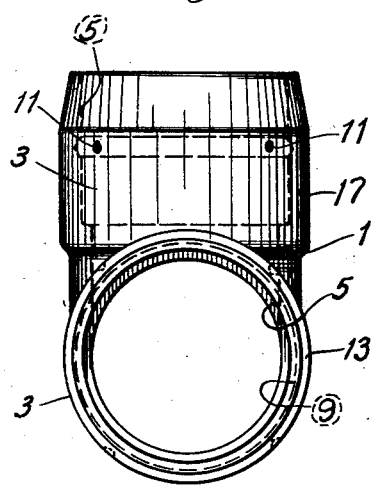

In the accompanying drawings, in which is illustrated one of the various possible embodiments of the invention, Fig. 1 is a longitudinal section showing the invention, certain portions being shown in elevation; and, Fig. 2 is an end elevation of the fitting shown in Fig. 1.

Similar reference characters indicate corresponding parts throughout the several views of the drawings.

Referring now more particularly to Fig. 1, there is illustrated at numeral 1 a fitting in the form of a T having nozzle or socket portions 3 which are counterbored in their retaining walls as shown at numerals 5.

The counterbores are adapted to telescope with suitable lengths of pipe or tubing or other conduit or member such as illustrated for example at numeral 7 in Fig. 1. The counterboring is preferably of a depth adapted to provide a substantially smooth interior surface at the joint made by the fitting. In the counterbore 5 of each nozzle 3 is formed an annular recess 9 with which communicate openings 11, said openings passing through the walls of the nozzles 3. The purpose of the openings 11 and connected recesses 9 is to permit the introduction of pre-liquid sealing material such as solder or the like into the joints between pipes or conduits such as 7 and the fitting 1 after cleaning has been effected and also an assembly by telescoping. The solder is introduced into the openings or ports or sprues 11, from whence it flows into the recesses 9 and around the nozzle, as well as around the inserted pipe 7. From there it moves, by capillary action, over substantially the entire contacting surfaces between pipe 7 and its respective nozzle 3 where it cools to form a seal. It will be understood that the groove 9 in each nozzle performs channelling function for distributing the solder or sealing material entirely around the joint and therefore it may be made in other forms, such as a plurality of recesses or a helical recess or the like. Furthermore, it is to be understood that the sprues 11 may be entirely dispensed with and the solder or other sealing material pre-introduced into the recesses such as 9 and later melted by applying heat after the telescoping between the pipe and fitting has been accomplished. It is to be understood that where the openings 11 are used, that the solder may be fed into these openings in stick or wire form and subsequently heated, or it may be pre-heated and introduced in liquid form.

One of the objects of the present invention is to provide an improved form of nozzle which will aid the distribution and final positioning of the sealing material in the joint and prevent waste of the sealing material. This is accomplished by exteriorly tapering or reducing the amount of material in each nozzle or socket as indicated at numeral 13, so that the thickness of the wall of the respective nozzle is decreased toward the outer end thereof.

The advantage of the taper 13 is that upon the application of heat to the nozzle, either from an external source such as a torch, or from the hot sealing material such as solder which is poured into the sprues 11, the end 15 heats more readily than the other portions of the nozzle, thus insuring an ample distribution of heat to said remote end 15 and insuring that sealing material will flow to the same at a high enough temperature to maintain the sealing material in a fluid condition. In other words, the taper is more responsive to thermal changes than is the remainder of the nozzle. This effect may be obtained by making the wall thinner otherwise than by tapering it, such as by making it thinner without taper otherwise reducing the amount of material therein. For instance, a stepped shoulder may be used at the outer end of the nozzle. Another advantage is that said end 15 also cools more quickly, and hence when the operator finds that the joint is sufficiently full of solder, and ceases the application of heat and/or solder or the like, the rapid cooling at the end forms a gate of solder or the like, thus preventing loss. By preventing loss of the solder or the like, there is insured an effective seal all around the conduit 7.

It will be understood that while we have shown a T fitting in the drawings, the invention is applicable to other forms of fittings such as curb stops, couplings, elbows and the like. It will also be understood that the form of sealing material may be varied over a wide range. Solder is preferable for many purposes, but other forms may be used in which the application of ambient heat with subsequent ambient cooling comprises part of the mode of applying the material, such as asphaltic compounds or the like.

The operation, so far as the invention is concerned is, substantially the same whether the heat be applied by external means, or upon pre-introduced sealing material, or whether the sealing material is introduced through the sprues 11 in a liquid state with or without the application of external heat.

It is clear that when it is desired to re-open the joint that the invention effects an advantage, because upon applying heat externally, the end 15 heats up more quickly and thus releases the solder gate or dam after which the remaining solder may flow out when sufficient heat flows to the body 17 of the nozzle.

It will be understood that the invention is broad enough to cover nozzles such as shown at numeral 3 which are integrally formed to lengths of conduits such as 7 for connection with other lengths. The term fitting is to be interpreted herein, not only as referring to a separate piece for joining conduits, but also to other forms of making a juncture wherein a separate piece or pieces are not used.

The drawings illustrate the practical optimum taper. For instance, on a one and one-half inch pipe coupling, a taper of $\tfrac{5}{32}$ of an inch on the diameter to $\tfrac{7}{16}$ length has been found suitable. This ratio is such that the taper is about the same for all of the fittings.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

In a joint having a socket, a member receivable in said socket, a film of sealing material introduced in liquid state between the socket and said member, the clearance between the socket and the member being of a size to induce capillary action on the film of sealing material in its liquid state, means for causing solidification of the film of sealing material at the end of the socket prior to solidification elsewhere, comprising a reduced portion at the end of the socket, whereby upon ambiently cooling the joint, cooling of the capillarily positioned liquid at said end is effected more rapidly than elsewhere.

In testimony whereof, we have signed our names to this specification this 17th day of March, 1930.

LEO EARL GRESLEY.
SAMUEL EUSEY.